(12) United States Patent
Abbaslou et al.

(10) Patent No.: US 10,213,770 B2
(45) Date of Patent: Feb. 26, 2019

(54) PROMOTED IRON CATALYSTS SUPPORTED ON CARBON NANOTUBES FOR FISCHER-TROPSCH SYNTHESIS

(71) Applicant: University of Saskatchewan, Saskatoon (CA)

(72) Inventors: Reza Abbaslou, Edmonton (CA); Ajay Dalai, Saskatoon (CA)

(73) Assignee: University of Saskatchewan, Saskatoon (CA)

( * ) Notice: Subject to any disclaimer, the term of this patent is extended or adjusted under 35 U.S.C. 154(b) by 13 days.

(21) Appl. No.: 13/667,333

(22) Filed: Nov. 2, 2012

(65) Prior Publication Data
US 2013/0116350 A1    May 9, 2013

Related U.S. Application Data

(60) Provisional application No. 61/555,229, filed on Nov. 3, 2011.

(30) Foreign Application Priority Data

Nov. 3, 2011 (CA) ....................................... 2757012

(51) Int. Cl.
*B01J 23/887* (2006.01)
*B82Y 30/00* (2011.01)
(Continued)

(52) U.S. Cl.
CPC ......... *B01J 23/8872* (2013.01); *B01J 21/185* (2013.01); *B01J 23/881* (2013.01);
(Continued)

(58) Field of Classification Search
CPC . B01J 23/745; B01J 23/76; B01J 23/78; B01J 23/8872; B01J 23/881; B01J 23/887;
(Continued)

(56) References Cited

U.S. PATENT DOCUMENTS 4,622,308 A * 11/1986 Koikeda ................ B01J 29/061
423/326
6,602,922 B1    8/2003 Davis et al.
(Continued)

FOREIGN PATENT DOCUMENTS

| CN | 101850258 | 10/2010 |
|---|---|---|
| EP | 1782885 A1 | 9/2007 |
| WO | 2011/053192 A2 | 5/2011 |

OTHER PUBLICATIONS

Mohammad Reza Malek Abbaslou—NPL: "Iron Catalyst Supported on Carbon Nanotubes for Fischer-Tropsch Synthesis: Experimental and Kinetic Study". Jun. 2010.*

(Continued)

*Primary Examiner* — Melvin C. Mayes
*Assistant Examiner* — Smita S Patel
(74) *Attorney, Agent, or Firm* — Bereskin & Par LLP/S.E.N.C.R.L., S.R.L.; Patricia Folkins

(57) ABSTRACT

The present application includes iron catalysts promoted with Mo, K and optionally Cu on a multi-walled carbon nanotube (MWCNT) support for high molecular weight hydrocarbon synthesis from synthesis gas.

13 Claims, 6 Drawing Sheets

(51) Int. Cl.
  B01J 37/02    (2006.01)
  B01J 21/18    (2006.01)
  B01J 23/881   (2006.01)
  B01J 35/00    (2006.01)
  B01J 35/10    (2006.01)
  C10G 2/00     (2006.01)

(52) U.S. Cl.
  CPC ......... *B01J 35/006* (2013.01); *B01J 35/1019* (2013.01); *B01J 35/1042* (2013.01); *B01J 37/0201* (2013.01); *B01J 37/024* (2013.01); *B01J 37/0207* (2013.01); *B82Y 30/00* (2013.01); *C10G 2/332* (2013.01); *C10G 2/341* (2013.01)

(58) Field of Classification Search
  CPC ... B01J 37/00; B01J 37/08; B01J 37/12; B01J 37/036; B01J 37/086; B01J 37/024; B01J 37/0201; B01J 37/0207; B01J 35/00; B01J 35/08; B01J 35/1019; B01J 35/1042; B01J 35/006; B01J 35/026; B01J 35/1061; B01J 21/185; C10G 2/00; C10G 2/332; B82Y 30/00; C07C 1/04
  See application file for complete search history.

(56) References Cited

U.S. PATENT DOCUMENTS

| | | | |
|---|---|---|---|
| 6,713,519 B2 | 3/2004 | Wang et al. | |
| 2004/0009871 A1* | 1/2004 | Hu et al. | 502/338 |
| 2005/0002851 A1* | 1/2005 | McElrath et al. | 423/447.3 |
| 2008/0176741 A1 | 7/2008 | Ma et al. | |

OTHER PUBLICATIONS

Thobeka Kenta—NPL: "Promotion effects of iron in carbon nanotubes synthesis to make supports for Fischer-Tropsch synthesis catalysts", Sep. 2010.*

Kente ("Promotion effects of iron in carbon nanotubes synthesis to make supports for Fischer-Tropsch Synthesis Catalysts", Sep. 2010, pp. 1-91).*

Bahome et al (NPL: "Fischer-Tropsch Synthesis over iron catalyst supported on carbon nanotubes", Applied catalysis A: General 287 (2005) pp. 60-67).*

Abbaslou et al (NPL: "Iron catalyst supported on carbon nanotubes for Fischer-Tropsch Synthesis: Effects of Mo promotion", Fuel vol. 90, Mar. 2011, pp. 1139-1144).*

CN101850258, Zhang et al, machine translation, 2010.*

Bukur, Dragomir B., et al., "Binder/Support Effects on the Activity and Selectivity of Iron Catalysts in the Fischer-Tropsch Synthesis", Ind. Eng. Chem. Res., 1990, 29, pp. 1588-1599.

O'Brien, Robert J., et al. "Activity and selectivity of precipitated iron Fischer-Tropsch catalysts", Catalysis Today 36, 1997, pp. 324-334.

Tavasoli, Ahmad, et al., "Fischer-Tropsch synthesis on mono- and bimetallic Co and Fe catalysts supported on carbon nanotubes", Fuel Processing Technology 90, 2009, pp. 1486-1494.

Abbaslou, Reza M. Malek, et al., "Iron catalysts supported on carbon nanotubes for Fischer-Tropsch synthesis: Effect of catalytic site position", Applied Catalysis A: General 367, 2009, pp. 47-52.

Abbaslou, Reza M. Malek, et al., "Effect of pre-treatment on physico-chemical properties and stability of carbon nanotubes supported iron Fischer-Tropsch catalysts", Applied Catalysis A: General 355, 2009, pp. 33-41.

Abbaslou, Reza M. Malek et al., "Effects of nanotubes pore size on the catalytic performances of iron catalysts supported on carbon nanotubes for Fischer-Tropsch synthesis", Applied Catalysis A: General 379, 2010, pp. 129-134.

Bahome, Munga C., et al., "Fischer-Tropsch synthesis over iron catalysts supported on nanotubes" Applied Catalysis A: General 287, 2005, pp. 60-67.

Ma, Wenping, et al., "Effect of Properties of Various Activated-Carbon Supports and Supported Fe—Mo—Cu—K Catalysts on Metal Precursor Distribution, Metal Reduction, and Fischer-Tropsch Synthesis", Energy Fuels, 2010, 24, pp. 4099-4110.

Eswaramoorthi, I. et al., "Appilcation of multi-walled carbon nanotubes as efficient support to NiMo hydrotreating catalyst", Applied Catalysis A: General 339, 2008, pp. 187-195.

Ma, Wenping, et al. "Development of Molybdenum-Promoted Catalysts Supported on Activated Carbon for Diesel Fuel Synthesis", Final Technical Report, C1 Chemistry for the Production of Ultra-Clean Liquid Transportation Fuels and Hydrogen, Consortium for Fossil Fuel Science, Apr. 10, 2006, pp. 16-26.

Shaodong, Qin, "Mo and Cu Modified FeK/SiO2 Catalysts for Fischer-Tropsch Synthesis", Chinese Journal of Catalysis, 2010, vol. 31, No. 9, Abstract only.

Tavasoli, Ahmad et al., "Fischer-Tropsch synthesis over cobalt catalyst supported on carbon nanotubes in a slurry reactor", Applied Catalysis A: General, 345, 2008, pp. 134-142.

Ma, Wenping, et al., "Mo—Fe Catalysts Supported on Activated Carbon for Synthesis of Liquid Fuels by the Fischer-Tropsch Process: Effect of Mo Addition on Reducibility, Activity, and Hydrocarbon Selectivity", Energy and Fuels, 2006, 20, pp. 2299-2307.

Bahome, Munga, C. et al, "Fe—Ru small particle bimettalic catalysts supported on carbon nanotubes for use in Fischer-Tropsch synthesis", Science Direct, Applied Catalysis A: General, 328, 2007, pp. 243-251.

Abbaslou, Reza M. Malek et al, "Iron catalyst supported on carbon nanotubes for Fischer-Tropsch synthesis: Effects of Mo promotion", Fuel, 90, 2011, pp. 1139-1144.

Abbaslou, Reza M. Malek et al, "Iron Catalyst Supported on Carbon Nanotubes for Fisher-Tropsch Synthesis: Experimental and Kinetic Study", PhD Thesis, University of Saskatchewan, published Jul. 6, 2012.

Office Action of corresponding Canadian Patent Application No. 2,757,012 dated May 17, 2018.

* cited by examiner

PROMOTED IRON CATALYSTS SUPPORTED ON CARBON NANOTUBES FOR FISCHER-TROPSCH SYNTHESIS

CROSS-REFERENCE TO RELATED APPLICATIONS

The present application claims the benefit of priority from U.S. provisional application No. 61/555,229 filed on Nov. 3, 2011 and Canadian patent application no. 2,757,012 filed on Nov. 3, 2011, the contents of which are incorporated herein by reference in their entirety.

FIELD OF THE APPLICATION

The present application generally relates to the field of catalysts for the chemical conversion of synthesis gas to hydrocarbons.

BACKGROUND OF THE APPLICATION

Fischer-Tropsch (FT) synthesis can be utilized to convert syngas into clean sources of energy such as diesel and naphtha.[1,2] To date only iron and cobalt catalysts have proven economically feasible on an industrial scale.[2] The high water-gas-shift (WGS) reaction rate of iron makes it a useful catalyst for converting hydrogen-lean syngas derived from coal and biomass gasification processes.[3] Improvements in catalyst selectivity, activity and stability are needed so as to improve FT process economy.[3,4]

The addition of one or more promoters can have an influence on the selectivity and/or activity of FT catalysts. For example, the product selectivity of an iron catalyst can be controlled by promoting it with one or more alkali metals. Potassium is a chemical promoter that has been reported to increase wax and alkene yields while decreasing the production of undesirable methane in FT catalysts.[5] Potassium promotion has also been reported to boost FTS and WGS activities of such catalysts. As CO tends to accept electrons from iron during the surface reactions of FTS, it has been postulated that potassium facilitates CO chemisorption due to its strong basicity because it can donate electrons to iron.[6] Copper has been added to precipitated iron catalysts to facilitate the reduction of iron oxide to metallic iron during hydrogen activation. Addition of the copper has been said to minimize the sintering of iron catalysts when activating with hydrogen by lowering the reduction temperature.[5]

It has been reported that the FT catalyst activity and selectivity can also be influenced by the nature and structure of the support, the nature of the active metal, metal dispersion, metal loading and the catalyst preparation method.[7,8] For example, the support may have significant effects on the catalyst activity and selectivity due to metal-support interactions, porosity and mass transfer limitations. Most studies on FT catalysts have been carried out with the metal supported on silica, alumina or titania. For example, Qin et al. have reported the effects of Mo and Cu promoters on the properties of $SiO_2$-supported FeK catalysts and their Fischer-Tropsch synthesis (FTS) performance.[9]

Other supports such as carbon in the form of activated carbon (AC) and carbon nanotubes (CNTs) have also been investigated in FT reactions.[10,11,12,13,14,15,16,17,18,19,20,21,22,23,24] For example, it has been reported that an iron catalyst supported on AC showed a higher throughput per unit volume as a consequence of higher dispersions and/or metal-support interactions, and higher olefin selectivity than unsupported iron catalysts.[25,26]

Ma et al. have reported iron catalysts with Mo—Cu—K additives for use in Fischer-Tropsch synthesis (FTS) supported on a number of activated carbons.[27,28] A study of the physico-chemical properties of activated carbon-supported Mo promoted Fe—Cu—K catalysts as a function of Mo loading (0-12%) has been reported by Ma et al.[29]

As mentioned above, CNTs with unique properties such as meso and macro pore structure, uniform and straight pores, inert surface properties, resistance to acidic and basic environments, and ease of recovery of metals from spent catalysts have been reported as a support for catalytic reactions. There have been a few studies on the application of CNTs as a support for Co and/or Fe catalysts for use in FTS.[14,15,18,19,20,21]

Tavasoli et al. discloses a catalyst prepared by incorporating cobalt, ruthenium, and optionally an alkali metal, for example, K onto a CNT support for the conversion of synthesis gases into a mixture of essentially linear and saturated hydrocarbons.[15] The use in FTS of mono- and bimetallic Co and Fe catalysts supported on CNTs has also been reported.[30]

Bahome et al. reported iron-based catalysts supported on CNTs for use in the FT reaction promoted with potassium and/or copper.[21]

Malek Abbaslou et al. have reported the effect of pretreatment with room temperature (25° C.) or refluxing (110° C.) nitric acid on CNT-supported catalysts with approximately 10 wt % iron content.[31] Malek Abbaslou et al. have also reported catalysts with approximately 12 wt % iron supported on CNTs wherein the position of the catalytic sites was varied to be primarily on the inner or primarily on the outer surface of the nanotubes.[32] Malek Abbaslou et al. have further reported catalysts with approximately 20 wt % iron supported on CNTs with narrow (average size 12 nm) and wide (average size 63 nm) pores.[33]

SUMMARY OF THE APPLICATION

In the present application, it has been demonstrated that the addition of Mo, K and optionally Cu to iron catalysts supported on multi-walled carbon nanotubes (MWCNTs) surprisingly improves catalytic performance, in particular towards the formation of high molecular weight hydrocarbons from synthesis gas.

Accordingly, the present application includes a catalyst comprising the formula (I):

$$Cu\text{—}K\text{—}Mo\text{—}Fe \qquad (I)$$

wherein

Cu is present in an amount of about 0 wt % to about 3 wt %;

K is present in an amount of about 0.05 wt % to about 5 wt %;

Mo is present in an amount of about 0.05 wt % to about 5 wt %; and

Fe is present in an amount of about 5 wt % to about 50 wt %; and a catalyst support, wherein the catalyst support is MWCNTs.

In an embodiment, the present application includes an iron catalyst promoted with Mo, K and optionally Cu on a MWCNT support wherein Cu is present in an amount of about 0 wt % to about 3 wt %, about 0.1 wt % to about 0.75 wt %, or about 0.5 wt %; K is present in an amount of about 0.05 wt % to about 5 wt %, about 0.1 wt % to about 1.5 wt %, or about 1 wt %; Mo is present in an amount of about 0.05 wt % to about 5 wt %; about 0.1 wt % to about 3 wt %, or about 0.5 wt %; and Fe is present in an amount of about 5 wt % to about 50 wt %, about 10 wt % to about 40 wt %, or about 30 wt %, the remainder comprising, or consisting essentially of, the MWCNT support.

In another embodiment, the catalysts of the present application are prepared using an incipient wetness impregnation method. For example, an aqueous solution comprising one or more suitable metal precursors is used to impregnate the support, followed by drying. In an embodiment, the support is first impregnated with an aqueous solution comprising a suitable iron salt, and optionally a suitable copper salt, followed by drying. The support is then impregnated with an aqueous solution comprising a suitable potassium salt, followed by drying. The support is then further impregnated with an aqueous solution comprising a suitable molybdenum salt, followed by drying. It is an embodiment of the application that the catalyst is reduced prior to use. Reduction of the catalyst is carried out, for example, in-situ by treating the catalyst with pure hydrogen gas.

Prior to impregnation with metals, it is a further embodiment that the support is treated with acid, for example nitric acid ($HNO_3$), followed by washing to remove residual acid and drying.

In an embodiment, the average particle size of the catalysts is from about 5 nm to about 20 nm.

The present application also includes a process for performing the Fischer-Tropsch reaction comprising reacting a synthesis gas with a catalyst of the application under conditions suitable to convert the synthesis gas to Fischer-Tropsch products.

The present application further includes a process for producing high molecular weight hydrocarbons from synthesis gas, the process comprising reacting the synthesis gas with a catalyst of the application under conditions suitable for the formation of high molecular weight hydrocarbons.

Other features and advantages of the present application will become apparent from the following detailed description. It should be understood, however, that the detailed description and the specific examples while indicating embodiments of the application are given by way of illustration only. The scope of the claims should not be limited by the embodiments set forth in the examples, but should be given the broadest interpretation consistent with the description as a whole.

BRIEF DESCRIPTION OF THE DRAWINGS

The present application will now be described in greater detail with reference to the drawings in which.

DETAILED DESCRIPTION OF THE APPLICATION

I. Definitions

Figure 1:
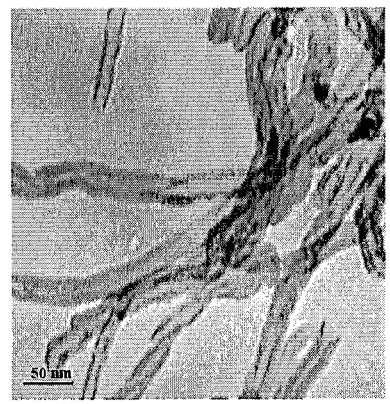
FIG. 1 is a TEM micrograph of an exemplary acid-treated MWCNT sample.

Unless otherwise indicated, the definitions and embodiments described in this and other sections are intended to be applicable to all embodiments and aspects of the disclosure herein described for which they are suitable as would be understood by a person skilled in the art.

As used in this application, the singular forms "a", "an" and "the" include plural references unless the content clearly dictates otherwise. For example, an embodiment including "a catalyst" should be understood to present certain aspects with one catalyst, or two or more additional catalysts.

In embodiments comprising an "additional" or "second" component, such as an additional or second catalyst, the second component as used herein is chemically different from the other components or first component. A "third" component is different from the other, first, and second components, and further enumerated or "additional" components are similarly different.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the desired product. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The term "wt %" as used herein, unless otherwise indicated, means percent by weight of the entire catalyst including the support.

The term "dry" or "drying" as used herein refers to the removal of essentially all of the solvent or solvents from a material. Suitable conditions for drying the supports or catalysts of the present application will be those sufficient for driving off essentially all of the solvent or solvents used in a previous application step.

The term "synthesis gas" as used herein means a gas comprising, as its major components, carbon monoxide (CO) and hydrogen ($H_2$). For example, synthesis gas may comprise 5-50% CO and 5-50% $H_2$. Synthesis gas may further comprise hydrogen sulfide ($H_2S$), carbon dioxide ($CO_2$), water ($H_2O$), methane ($CH_4$), higher hydrocarbons, nitrogen ($N_2$) and other contaminants. Synthesis gas is available, for example, from the gasification of biomass (a thermal-chemical process that uses partial oxidation to convert organically derived feedstock into synthesis gas); gasification of hydrocarbonaceous materials such as coal, high specific gravity oils, or natural gas; as a by-product of partial combustion cracking of hydrocarbons; by steam reforming of liquid or gaseous hydrocarbons; through the water-gas-shift reaction; or some combination of these. The CO and $H_2$ may also be generated separately and combined.

The term "Fischer-Tropsch reaction" as used herein refers to a heterogeneous surface catalyzed process that converts synthesis gas to Fischer-Tropsch products.

The term "Fischer-Tropsch products" as used herein refers to the products formed from the conversion of synthesis gas in the Fischer-Tropsch reaction. Fischer-Tropsch products include, but are not limited to, hydrocarbons and oxygenates. For example, Fischer-Tropsch products may comprise alkanes, which may be branched or un-branched, alkenes, aromatic compounds and alcohols. Fischer-Tropsch products may also comprise carbon dioxide ($CO_2$) and water ($H_2O$).

The term "high molecular weight hydrocarbons" as used herein refers to hydrocarbons with a carbon number equal to or greater than 5 ($C_5^+$ hydrocarbons).

The term "O/P ratio" as used herein means the ratio of olefinic light gaseous products ($C_2$-$C_4$) to paraffinic gaseous products ($C_2$-$C_4$).

II. Catalysts of the Application

MWCNTs were used as supports for iron catalysts promoted with Mo, K, and optionally Cu. The effect of K and Cu promotion on the activity and selectivity of Mo promoted iron catalysts supported on MWCNTs for FTS was studied using a fixed bed reactor (2 MPa, 270° C. and $H_2$/CO=1). Potassium (1-2 wt %) and copper (0.5-1 wt %) promotion did not change the surface area or the metal particle size compared to the Mo promoted iron catalyst. Based on TPR analyses, Cu promotion (0.5-1 wt %) decreased the reduction temperature by up to approximately 120° C. Addition of K (1-2 wt %) shifted the product selectivity toward higher molecular weight hydrocarbons. Both K and Cu increased the catalyst activity for FTS and WGS reactions. The most effective catalyst among the studied catalysts (0.5Cu-1K-0.5Mo-30Fe/CNT) showed excellent activity (5.6 mg HC/g-Fe/h) and product selectivity ($C_{5+}$ selectivity of 76 wt %). A kinetic study on the most effective catalyst (0.5Cu-1K-0.5Mo-30Fe/CNT) was performed using an integral reactor. Based on a first order reaction rate model, the kinetic study verified that the Mo, K and Cu promoted iron catalyst supported on MWCNTs is more active than precipitated and commercial iron catalysts under similar operating conditions.

Accordingly, the present application includes a catalyst comprising the formula (I):

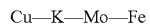  (I)

wherein

Cu is present in an amount of about 0 wt % to about 3 wt %;
K is present in an amount of about 0.05 wt % to about 5 wt %;
Mo is present in an amount of about 0.05 wt % to about 5 wt %; and
Fe is present in an amount of about 5 wt % to about 50 wt %; and
a catalyst support, wherein the catalyst support is MWCNTs.

In an embodiment, the present application includes an iron catalyst promoted with Mo, K and optionally Cu on a MWCNT support wherein Cu is present in an amount of about 0 wt % to about 3 wt %, about 0.1 wt % to about 0.75 wt %, or about 0.5 wt %; K is present in an amount of about 0.05 wt % to about 5 wt %, about 0.1 wt % to about 1.5 wt %, or about 1 wt %; Mo is present in an amount of about 0.05 wt % to about 5 wt %; about 0.1 wt % to about 3 wt %, or about 0.5 wt %; and Fe is present in an amount of about 5 wt % to about 50 wt %, about 10 wt % to about 40 wt %, or about 30 wt %, the remainder comprising, or consisting essentially of, the MWCNT support.

In a further embodiment, the catalyst of the present application comprises about 0.5 wt % Cu, about 1 wt % K, about 0.5 wt % Mo and about 30 wt % Fe, the remainder comprising, or consisting essentially of, the MWCNT support.

In another embodiment, the catalysts of the present application are prepared using an incipient wetness impregnation method. For example, an aqueous solution comprising one or more suitable precursor compounds is used to impregnate the support, followed by drying. In an embodiment, the support is first impregnated with an aqueous solution comprising a suitable iron salt, and optionally a suitable copper salt, followed by drying, for example at about 40° C. to about 150° C., or about 120° C., for a time sufficient to dry the support, for example about 12 hours. The support is then impregnated with an aqueous solution comprising a suitable potassium salt, followed by drying. The support is then further impregnated with an aqueous solution comprising a suitable molybdenum salt, followed by drying. The iron catalyst promoted with K, Mo and optionally Cu supported on MWCNTs is then calcined at a suitable temperature, for example about 200° C. to about 500° C., or about 400° C. for a time suitable to achieve calcination, for example about 0.1 hours to about 24 hours, or about 3 hours, in a flow of an inert gas, for example, $N_2$, He or Ar.

Prior to impregnation with metals, it is a further embodiment that the support is treated with acid, for example nitric acid ($HNO_3$), including about 30% to about 90%, or about 60 wt % $HNO_3$, at about 50° C. to about 175° C., or about 110° C., for about 5 hours to about 25 hours, or about 16 hours, followed by washing, for example with distilled water, to remove residual acid and drying, for example at about 100° C. to about 150° C., or about 120° C., for a time sufficient to dry the support.

The impregnation will typically be carried out until the catalyst support has absorbed a volume of impregnating solution equal to at least about 100% of its calculated pore volume, suitably to where conditions of incipient wetness are attained. By incipient wetness it is meant that the support has adsorbed an amount of solution generally equivalent to its calculated pore volume. Pore volume is a discernible quantity that can be measured directly or indirectly by known techniques such as porosimetry. The volume of impregnating solution contemplated will vary from about 10% to about 1000% of the calculated pore volume of the catalyst. Suitably, the volume of treatment solution will be from about 30% to about 200%, most preferably from about 70% to about 100% of the calculated pore volume of the catalyst.

The impregnating solution will remain in contact with the support for about 1 minute to about 24 hours, suitably from about 5 minutes to about 5 hours. The time required for the treatment will vary depending on factors such as the metal loading of the support being treated, the quantity thereof, the composition and volume of the impregnating solution, the reactor configuration and the like. The treatment is carried out at a temperature from about 0° C. to about 100° C., or from room temperature, i.e. about 20-25° C., to about 80° C. The pressure is not particularly critical with about atmospheric pressure being suitable.

Once the support has absorbed the desired volume of impregnating solution, it undergoes oxidation in the presence of the impregnating solution. It is an embodiment of the application that the catalyst is reduced prior to use. Reduction of the catalyst is performed, for example, by treating the catalyst with pure hydrogen gas. In an embodiment, the reduction is carried out in-situ. In this embodiment, the catalyst is placed in the reactor diluted with, for example, silicon carbide in a ratio of about 0.1 g to about 10 g, or about 1 g catalyst to about 7 g silicon carbide, pure hydrogen gas is introduced at a flow rate of from about 5 ml/min to about 200 ml/min, or about 30 ml/min, and the reactor temperature increased from about room temperature, i.e. about 20-25° C., to about 200° C. to about 500° C., or about 380° C. at a rate of about 0.1° C./min to about 20° C./min, or about 1° C./min, and maintained at this temperature for a time suitable to activate the catalysts, for example about 0.1 hours to about 48 hours, or about 14 hours. After the activation period, the reactor is decreased to a temperature of about 200° C. to about 350° C., or about 270° C. under flowing hydrogen gas.

In an embodiment of the application, the precursor compound for Fe is iron (III) nitrate nonahydrate (Fe$(NO_3)_3 \cdot 9H_2O$), the precursor compound for Cu is copper (II) nitrate trihydrate (Cu$(NO_3)_2 \cdot 3H_2O$), the precursor compound for K is potassium nitrate (KNO$_3$), and the precursor compound for Mo is ammonium heptamolybdate tetrahydrate ((NH$_4$)$_6$Mo$_7$O$_{24} \cdot 4H_2O$), although a person skilled in the art would appreciate that other precursor compounds can be used in place of these compounds without deviating from the scope of the present application. These precursor compounds are commercially available.

In an embodiment, the average particle size of the catalysts is from about 5 nm to about 20 nm.

III. Processes of the Application

The catalysts of the present application are useful for the conversion of synthesis gas to hydrocarbons (in particular high molecular weight hydrocarbons) in the so-called Fischer-Tropsch reaction.

The present application therefore includes a process for performing the Fischer-Tropsch reaction comprising reacting a synthesis gas with a catalyst of the application under conditions suitable to convert the synthesis gas to Fischer-Tropsch products.

In an embodiment of the present application, the conditions suitable to convert the synthesis gas to Fischer-Tropsch products comprise a temperature of about 200° C. to about 350° C., or about 270° C.; a pressure of about 0.1 MPa to about 10 MPa, or about 2 MPa, and a gas hourly space velocity (GHSV) of about 500 to about 10,000 ml(STP)/(h·g-cat), or about 3600 ml(STP)/(h·g-cat).

The present application also includes a process for producing high molecular weight hydrocarbons from synthesis gas, the process comprising reacting the synthesis gas with a catalyst of the application under conditions suitable for the formation of high molecular weight hydrocarbons.

In an embodiment of the present application, the conditions suitable for the formation of high molecular weight hydrocarbons comprise a temperature of about 200° C. to about 350° C., or about 270° C.; a pressure of about 0.1 MPa to about 10 MPa, or about 2 MPa, and a gas hourly space velocity (GHSV) of about 500 to about 10,000 ml(STP)/(h·g-cat), or about 3600 ml(STP)/(h·g-cat).

In a further embodiment of the present application, the molar ratio of H$_2$:CO in the synthesis gas is about 0.1:1 to about 4:1, or about 1:1.

In accordance with the present application, and as described above, the catalysts of the present application are activated prior to use to convert synthesis gas to high molecular weight hydrocarbons. Reduction of the catalyst is performed, for example, by treating the catalyst with pure hydrogen gas. In an embodiment, the reduction is carried out in-situ. In this embodiment, the catalyst is placed in the reactor diluted with, for example, silicon carbide in a ratio of about 0.1 g to about 10 g, or about 1 g catalyst to about 7 g silicon carbide, pure hydrogen gas is introduced at a flow rate of from about 5 ml/min to about 200 ml/min, or about 30 ml/min, and the reactor temperature increased from about room temperature, i.e. about 20-25° C., to about 200° C. to about 500° C., or about 380° C. at a rate of about 0.1° C./min to about 20° C./min, or about 1° C./min, and maintained at this temperature for a time suitable to activate the catalysts, for example about 0.1 hours to about 48 hours, or about 14 hours. After the activation period, the reactor is decreased to a temperature of about 200° C. to about 350° C., or about 270° C. under flowing hydrogen gas.

In another embodiment, the process of the application is carried out as a continuous process with a catalyst of the present application in a suitable reactor, for example a fixed bed reactor, a slurry reactor, a loop reactor, a bubble-column reactor or a fluid-bed reactor. Accordingly, the present application also includes a reactor comprising a catalyst of the application.

Effluent reactant gases and liquids from the process may be separated and recycled, if desired, for further hydrocarbon synthesis. Industrial methods of collecting the products are well known and include fractional distillation and the like. Auxiliary equipment is conventional and known to those skilled in the art.

The following non-limiting examples are illustrative of the present application:

EXAMPLES

Example 1: Preparation and Characterization of MWCNT-Supported Iron Catalysts

Materials and Methods
(a) Preparation of MWCNT-Supported Iron Catalysts

Catalysts were prepared using an incipient wetness impregnation method on MWCNT supports (MKnano, surface area 220 m$^2$/g, pore volume 0.58 ml/g). Prior to impregnation, the MWCNT sample was treated in 60 wt % nitric acid at 110° C. for 16 hours, washed with distilled water several times, and dried at 120° C. for 6 h. Specific details regarding the preparation of each MWCNT-supported iron catalyst are as follows:

(i) Preparation of 0.5Mo-30Fe/CNT

To dope with 30 wt % iron, a solution containing the required amount of $Fe(NO_3)_3 \cdot 9H_2O$ dissolved in deionized water was added dropwise to the acid-treated MWCNT support in two portions. The iron-doped MWCNTs were then dried at 120° C. for 12 hours. To dope with 0.5 wt % molybdenum, a solution containing the required amount of $(NH_4)_6Mo_7O_{24} \cdot 4H_2O$ dissolved in deionized water was then added dropwise to the sample. The sample was then dried at 120° C. for 12 hours and calcined at 400° C. for 3 hours to give a MWCNT-supported iron catalyst promoted with molybdenum.

(ii) Preparation of 1K-0.5Mo-30Fe/CNT and 2K-0.5Mo-30Fe/CNT

To dope with 30 wt % iron, a solution containing the required amount of $Fe(NO_3)_3 \cdot 9H_2O$ dissolved in deionized water was added dropwise to the acid-treated MWCNT support in two steps. The iron-doped MWCNTs were then dried at 120° C. for 12 hours. To dope with 1 or 2 wt % potassium, a solution containing the required amount of $KNO_3$ dissolved in deionized water was then added dropwise to the iron-doped MWCNTs. The samples were dried at 120° C. for 12 hours. To dope with 0.5 wt % molybdenum, a solution containing the required amount of $(NH_4)_6Mo_7O_{24} \cdot 4H_2O$ dissolved in deionized water was then added dropwise to the samples. The samples were then dried at 120° C. for 12 hours and calcined at 400° C. for 3 hours to give MWCNT-supported iron catalysts promoted with potassium and molybdenum.

(iii) Preparation of 0.5Cu-1K-0.5Mo-30Fe/CNT and 1Cu-1K-0.5Mo-30Fe/CNT

To dope with 30 wt % iron and 0.5 or 1 wt % copper, a solution containing the required amount of $Fe(NO_3)_3 \cdot 9H_2O$ and $Cu(NO_3)_2 \cdot 3H_2O$ dissolved in deionized water was added dropwise to the acid-treated MWCNT support in two steps. The iron- and copper-doped MWCNTs were then dried at 120° C. for 12 hours. To dope with 1 or 2 wt % potassium, a solution containing the required amount of $KNO_3$ dissolved in deionized water was then added dropwise to the samples. The samples were then dried at 120° C. for 12 hours. To dope with 0.5 wt % molybdenum, a solution containing the required amount of $(NH_4)_6Mo_7O_{24} \cdot 4H_2O$ dissolved in deionized water was then added dropwise to the samples. The samples were then dried at 120° C. for 12 hours, and calcined at 400° C. for 3 hours to give MWCNT-supported iron catalysts promoted with copper, potassium and molybdenum.

(b) Characterization of MWCNT-Supported Iron Catalysts

Catalysts were characterized using transmission electron microscopy (TEM), nitrogen adsorption, X-ray diffraction (XRD), temperature programmed reduction (TPR) and inductively coupled plasma (ICP).

The morphology of the calcined and used (after FT reactions) catalysts was studied using TEM. Sample specimens for TEM studies were prepared by ultrasonic dispersion of the catalysts in ethanol. The resulting suspensions were then dropped onto a copper grid. TEM analyses were carried out using a Hitachi H-7500 (120 kV) instrument. For each sample, several TEM micrographs were recorded and analyzed to determine particle size distributions.

The surface area and pore volume of the catalysts were measured by an ASAP-2000 system from Micromeritics. Prior to analysis, the samples were degassed at 200° C. for 2 hours under 50 mTorr vacuum.

XRD diffractograms of pure MWCNTs and calcined catalysts were conducted using a Philips PW1840 X-ray diffractometer with monochromatized Cu/Kα radiation. Using Scherrer's equation, the average sizes of the metal oxide crystallites in the calcined catalysts were estimated.

Temperature programmed reduction profiles of the calcined catalysts were recorded using a CHEMBET™-3000, equipped with a thermal conductivity detector. The catalyst samples were first purged in a flow of helium at 150° C. to remove traces of water, and then cooled to 40° C. TPR of 100 mg of each sample was performed using 5% hydrogen in nitrogen gas mixture with a flow rate of 40 ml/min. The samples were heated from 40° C. to 800° C. with a heating rate of 10° C./min.

(c) Fischer-Tropsch Synthesis Using CNT-Supported Iron Catalysts

Figure 6:
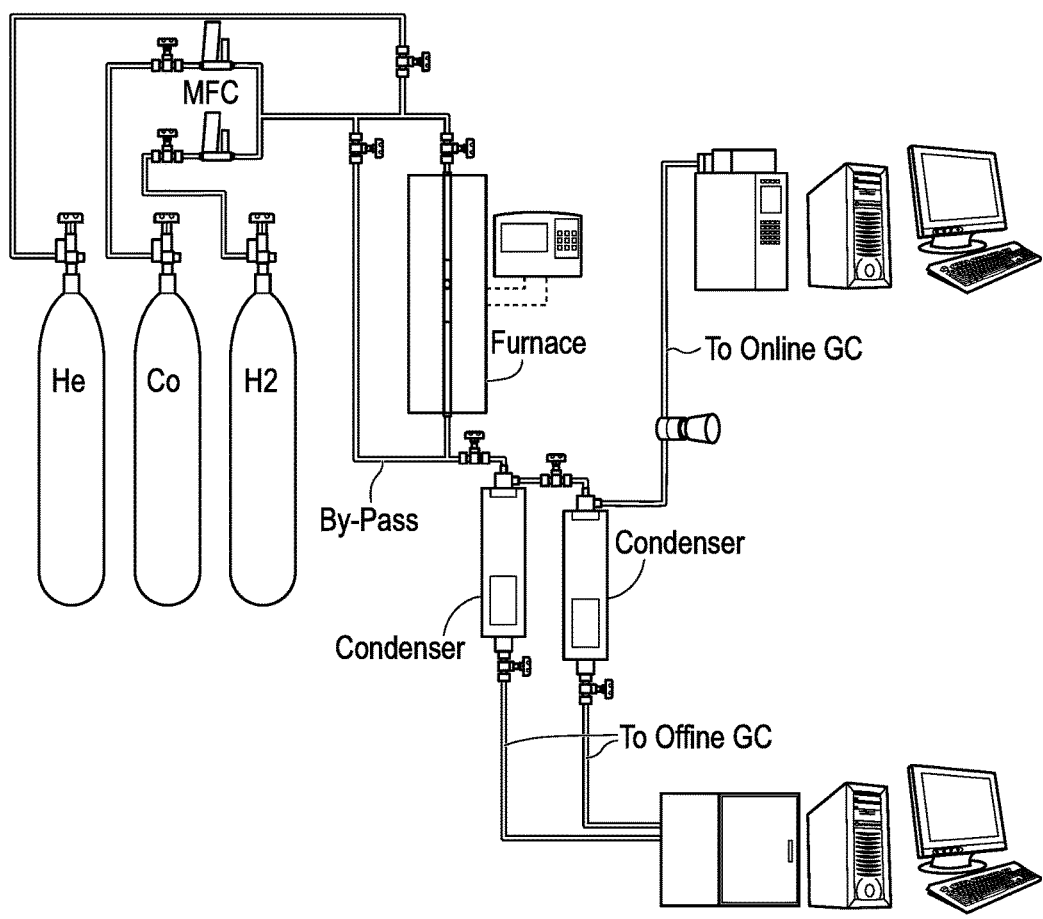
FIG. 6 shows a schematic of a fixed bed reactor for Fischer-Tropsch synthesis.

Fischer-Tropsch synthesis was performed in a fixed-bed micro reactor. FIG. 6 shows a schematic, and FIG. 7 shows the front view of the fixed bed reactor for Fischer-Tropsch synthesis. Prior to CO hydrogenation, in-situ reduction was conducted according to the following procedure: The diluted catalyst (1 g catalyst and 7 g silicon carbide) was placed in the reactor. Then, pure hydrogen was introduced at a flow rate of 30 ml/min. The reactor temperature was increased from room temperature to 380° C. at a rate of 1° C./min and the reactor was maintained at this activation condition for 14 h. After the activation period, the temperature was reduced to 270° C. under flowing hydrogen. Hydrogen and syngas flow rates were controlled by two mass flow controllers (Brooks 5850). Argon was used as internal standard gas in the reactor feed. The mixed gases (45% CO, 45% $H_2$, 10% Ar) entered through the top of the fixed bed reactor. The temperature of the reactor was controlled using a PID temperature controller. Synthesis gas with a space velocity of 3600 ml(STP)/(h·g-cat) was introduced into the reactor while the reactor pressure was set to 2 MPa. Reaction products were continuously removed after passing through two traps. The pressure of the uncondensed gaseous product stream was reduced to atmospheric pressure. The composition of the outlet gas stream was measured using an on-line GC-2014 Shimadzu™ gas chromatograph. The contents of the liquid traps were removed every 24 h. Hydrocarbon and water fractions were separated, and analyzed by a Varian 3400 gas chromatograph. The catalytic activity, product selectivity and stability of the catalyst was monitored during a reaction period of 125 hours.

Results and Discussion (a) Characterization of MWCNT-Supported Iron Catalysts

TEM images of the acid-treated MWCNT sample and the 1K-0.5Mo-30Fe/CNT and 2K-0.5Mo-30Fe/CNT catalysts were recorded. As can be seen in FIG. 1, a representative micrograph of the nitric acid-treated MWCNT sample, the nanotubes have substantially uniform diameters. The inner and outer diameters of the nanotubes were found to vary between 8-12 nm and 20-25 nm, respectively. TEM analysis also indicates that a vast majority (more than 70%) of the acid-treated nanotubes have open caps.

Figure 2:
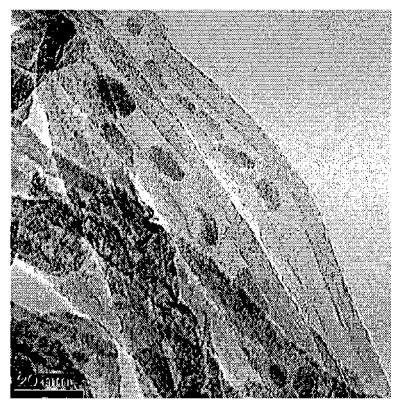
FIG. 2 is a TEM micrograph of an exemplary 1Cu-1K-0.5Mo-30Fe/CNT catalyst of the application.
Figure 3:
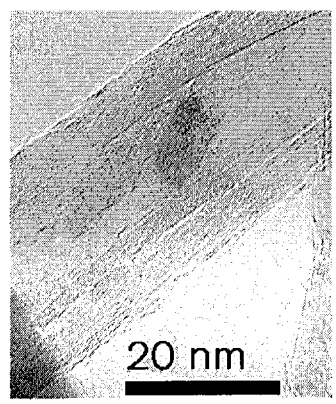
FIG. 3 is a high resolution TEM micrograph of an exemplary 2K-0.5Mo-30Fe/CNT catalyst of the application showing graphite layers and the crystalline structure of an iron oxide particle inside the nanotubes' pores.

FIGS. 2 and 3 show representative TEM images of the 1Cu-1K-0.5Mo-30Fe/CNT and 2K-0.5Mo-30Fe/CNT catalysts, respectively. Dark spots represent the iron oxide particles which are attached inside or outside of the nanotubes. For all catalysts, a vast majority of the iron particles (80%) were found to be distributed on the inner surface of the MWCNT pores. While not wishing to be limited by theory, this result can be explained by the carbon nanotubes' tubular structure, which can induce capillary forces during the impregnation process. FIG. 3 also shows the 12-18 graphite layers of the nanotubes and the crystalline structure of the iron oxide particles.

Table 1 shows the results from nitrogen adsorption analyses of the un-doped MWCNT support, and the MWCNT-supported iron catalysts. According to the N₂ adsorption analysis, loading 30% Fe and 0.5% Mo decreased the surface area from 220 to 140 m²/g and pore volume from 0.58 to 0.42 ml/g. An increase in the density of CNTs due to iron loading and pore blockage can result in lower surface areas of the loaded catalysts. However, promotion with Cu and K did not have a noticeable effect on the surface area of the catalysts.

In order to study the structure, oxidation state and metal oxide particle size, XRD analyses were conducted on all catalysts studied. The diffraction peaks matched very well with the standard Hematite (Fe₂O₃) phase typically observed for fresh catalysts. In addition, the representative peaks for the graphene layers of multi-walled nanotubes were present at 2θ angles of 26° and 44°. The crystallite phase of K and Cu species did not appear in the XRD spectra of the promoted catalysts. This may be attributed to the small amount of these components and to their high dispersion.

Table 1 shows the average iron oxide particle sizes of the catalysts estimated from XRD peak broadening. According to Scherrer's equation at the most intense peak of 35.7°, the average particle size for fresh 0.5Mo-30Fe/CNT catalyst is 15 nm. The addition of K and Cu to the 0.5Mo-30Fe/CNT catalyst did not result in a noticeable change in the average particle sizes. Table 1 also provides a comparison of the particle sizes estimated based on XRD with the size distribution of the particles obtained via TEM analysis. It can be seen that there is a good agreement between the data for average particle size calculated from XRD and the data obtained via TEM analyses.

Figure 4:
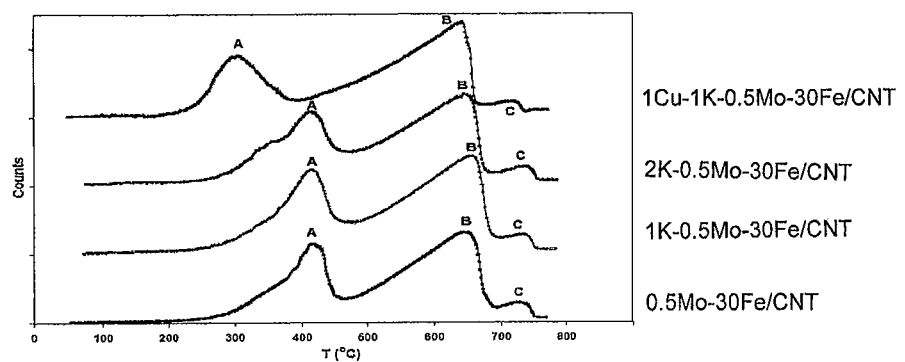
FIG. 4 shows the reduction profiles from room temperature to 800° C. for exemplary Mo, K and Cu promoted iron catalysts supported on MWCNTs.

The reducibility of the catalysts was studied using TPR analyses. The reduction patterns of the catalysts are shown in FIG. 4. Three peaks (A, B, and C) can be identified on the TPR profile of the catalysts. Generally, the reduction of iron oxides takes place according to the following scheme:

$$Fe_2O_3 \rightarrow Fe_3O_4 \rightarrow FeO \rightarrow Fe \quad (1)$$

It has been reported that the reduction of Fe₃O₄ to metallic Fe by H₂ can be accomplished in one step, and a broad peak has been observed between 377 and 750° C. for precipitated-iron catalysts.[34] According to the TPR pattern of the catalysts shown in FIG. 4, the first peak (A) can be assigned to the reduction of Fe₂O₃ to Fe₃O₄. Peak B, observed at 600-700° C., can be related to the reduction of Fe₃O₄ to metallic Fe. Peak C can be attributed to gasification of CNTs at a temperature higher than 600° C.

The effects of K and Cu additions on the reduction temperature can also be seen in FIG. 4. Promotion of the molybdenum-promoted iron catalysts with Cu resulted in a significant decrease in reduction temperature. In other words, while the reduction temperature for the first peak for the 0.5Mo-30Fe/CNT catalyst is 421° C., addition of 1 wt % copper decreased the reduction temperature to 304° C. This indicates copper promotion reduces the temperature at which the first reduction step occurs. Lower reduction temperatures can lead to a higher extent of reduction. The extent of reduction of the catalyst metal was quantified using the amount of H₂ consumed in the TPR process between 25 and 700° C. The thermal conductivity detector (TCD) was calibrated by reducing pure Ag₂O. The corresponding results for the catalysts are summarized in Table 2. The extent of reduction (from 25 to 800° C.) for the 0.5Mo-30Fe/CNT catalyst and the 1K-0.5Mo-30Fe/CNT and 2K-0.5Mo-30Fe/CNT catalysts were found to be similar (66-72%). However, addition of 0.5 and 1 wt % Cu resulted in a considerable increase in the extent of reduction to values over 80%. A similar trend was observed for isothermal reduction (400° C. for 5 h) of the catalysts. For example, while the extent of reduction for the 1K-0.5Mo-30Fe/CNT catalyst was only 57%, the addition of 0.5 wt % Cu increased the extent of reduction of iron oxide to 70%.

(b) Fischer-Tropsch Synthesis

The activity and selectivity of the catalysts was measured in a fixed bed reactor at a constant GHSV of 3.6 Sl/g-cat/h, a temperature of 270° C. and a pressure of 2 MPa. CO hydrogenation (blank runs with no iron) was performed on the acid-treated MWCNT supports under the same operating conditions as metal loaded samples. In this blank run, the main product formed at a very low conversion (1%) was methane with almost no higher hydrocarbons.

Figure 5:
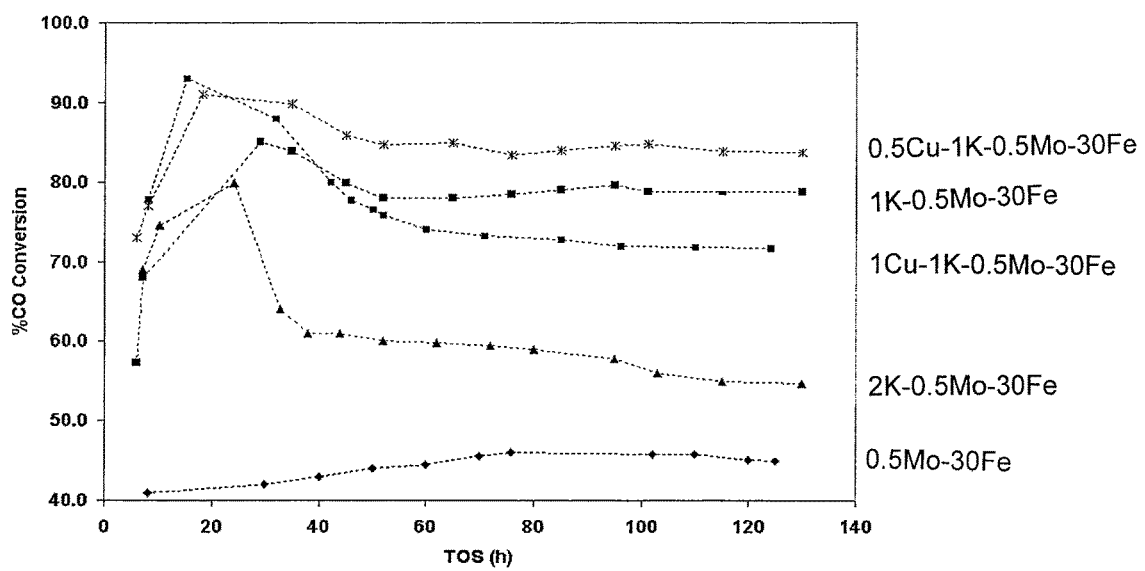
FIG. 5 shows the change in % CO conversion with time on stream for exemplary Mo, K and Cu promoted iron catalysts (operating conditions: 3.6 Sl/g-cat/h, P=2 Mpa, T=270° C., time=125 h).

FIG. 5 shows the results of CO conversion over the reaction period of 125 hours. As can be seen in the figure, the 0.5Mo-30Fe/CNT catalyst showed the lowest FT activity. A gradual increase (from 41 to 45%) in CO conversion during the reaction period can also be observed which may be attributed to slow carbide formation due to the presence of Mo.[17]

The catalyst with 1 wt % of potassium (1K-0.5Mo-30Fe/CNT) reached a maximum CO conversion of 85% after 30 hours, then experienced an 8% decline in FT activity which remained stable until the end of the reaction period.

The catalyst with 2 wt % of potassium (2K-0.5Mo-30Fe/CNT) reached a maximum activity of 80%, followed by a sharp decrease of 25% in activity in a period of 35 hours. Comparing this result to that obtained for the 1K-0.5Mo-30Fe/CNT catalyst discussed above, it can be observed that addition of a higher concentration of K (2 wt % rather than 1 wt %) resulted in a lower activity.

Addition of 0.5 and 1 wt % Cu to the 1K-0.5Mo-30Fe/CNT catalyst increased the initial CO conversion to 90 and 93%, respectively. However, the 1Cu-1K-0.5Mo-30Fe/CNT catalyst also experienced a gradual deactivation over the course of the 125 hour reaction period. The copper-promoted catalysts reached their initial and maximum activity more rapidly (within 15-18 h) than the catalysts with only potassium (within 24-28 h).

Table 3 shows the catalytic activity and product selectivity of MWCNT-supported iron catalysts after a time on stream (TOS) of 125 h. The 0.5Mo-30Fe/CNT catalyst exhibited a greater selectivity toward methane (16%) and light hydrocarbons (α=0.7) than the potassium-promoted catalysts (α>0.8). Promotion of the catalyst with 1 wt % K resulted in a significant shift in selectivity toward higher hydrocarbons ($C_{12}+$ selectivity of 29% and α=0.8) and lower methane production (5%). As can be observed in Table 3, K promotion also increases the water gas shift activity.

Addition of a higher concentration of K (2K-0.5Mo-30Fe/CNT) resulted in slight decrease in CH₄ formation (3%) and an increase in $C_{12}+$ selectivity (46%).

As can be observed in Table 3, addition of Cu (0.5 and 1 wt %) to the catalyst (0.5Cu-1K-0.5Mo-30Fe/CNT and 1Cu-1K-0.5Mo-30Fe/CNT) resulted in a slight increase in methane selectivity and a decrease in heavy hydrocarbon selectivity.

Considering the stability, activity and product selectivity of these catalysts, the potassium promoted catalyst with low promoter contents (0.5Cu-1K-0.5Mo-30Fe/CNT) can be selected as the most effective catalyst among the catalysts studied for Fischer-Tropsch reactions.

A comparison of activity and selectivity of the most effective catalyst from this work with a number of comparable iron catalysts for FT reactions is given in Table 4. Some of data from the literature was calculated based on the information provided in the references for easier comparison. Considering effects of the operating conditions on FT reactions, the 0.5Cu-1K-0.5Mo-30Fe/CNT catalyst exhibited the lowest $CH_4$ and $CO_2$ selectivity and the highest $C_5+$ selectivity compared to the other catalysts given in Table 4. In addition, the 0.5Cu-1K-0.5Mo-30Fe/CNT catalyst showed very high activity for hydrocarbon production. For example, the 0.5Cu-1K-0.5Mo-30Fe/CNT catalyst can convert syngas with a GHSV of 10.8 Sl/g.cat.h with a CO conversion of 95% and a catalytic activity of 5.6 g-HC/g-Fe/h. To the best of our knowledge, such a high level of activity for a FT catalyst is not reported in the open literature. As far as the commercial viability of iron-based FT catalysts is concerned, a great deal of emphasis has been put on ability of the catalyst to produce 1-alkenes for use in chemical industry. As can be seen from the O/P ratios reported in Table 4, the product selectivity of the 0.5Cu-1K-0.5Mo-30Fe/CNT catalyst toward olefins is higher than those reported in literature. In terms of stability, the 0.5Cu-1K-0.5Mo-30Fe/CNT catalyst experienced minor deactivation of 4% in CO conversion from initial stabilization (40 h) to 450 h.

Example 2: Kinetics of FTS Reactions

As discussed above, the optimal catalyst in this work (0.5Cu-1K-0.5Mo-30Fe/CNT) showed excellent catalytic activity and selectivity for FT reactions. Accordingly, a kinetic study was undertaken to (1) identify an appropriate combination of mechanistic-based rate equations for the simultaneous Fischer-Tropsch and water-gas-shift reactions; (2) calculate the reaction rate constants for the most suitable combination of reaction rates which can be used for reactor modeling; and (3) compare the activity of this catalyst with commercial catalysts and other iron catalysts reported in the literature.

In order to study the kinetics of FT reactions using the 0.5Cu-1K-0.5Mo-30Fe/CNT catalyst, an integral reactor model was used. Isothermal conditions for the fixed bed reactor were achieved by addition of silicon carbide as filler to the catalyst bed. To eliminate interphase and intraparticle mass transport limitations, a small catalyst size of 60 mesh was used. Using Weisz-Prater and Mears criteria[35], the effects of interphase and intraparticle mass transport resistances were examined, and it was found that both transport effects could be neglected.

The FT and WGS reactions can be written as follows:

$$\text{(FT reaction)} nCO+(n+m/2)H_2 \rightarrow C_nH_m+nH_2O \qquad (2)$$

$$\text{(Water-gas-shift reaction)} CO+H_2O \leftrightarrows CO_2+H_2 \qquad (3)$$

wherein n is the average carbon chain length of the hydrocarbon products and m is the average number of hydrogen atoms per hydrocarbon molecule. The equations describing the reactor model consist of a mass balance for each particular component that may be written as follows:

$$\frac{dF_i}{dz} = r_i \cdot \rho_B \cdot A_r \qquad (4)$$

wherein $F_i$ is the molar flow rate (mol/h) of component i (CO, $H_2$, $CO_2$, $H_2O$ and $C_nH_m$), z is the reactor length (cm), $r_i$ is the overall reaction rate for each component (mol/g-cat/h), $\rho_B$ is the catalyst bed density (g-cat/ml), and $A_r$ is the cross-sectional surface area of the reactor ($cm^2$).

The overall reaction rate for each component ($H_2$, CO, $CO_2$, $H_2O$, and $C_nH_m$) consisted of the sum of the reaction rates of each chemical reaction (2) and (3) with the relevant stoichiometric coefficient. For example, $$r_{co} = r_{FT} + r_{WGS} \qquad (5)$$

wherein rco is the total rate of consumption of carbon monoxide and $r_{FT}$ and $r_{WGS}$ are the reaction rates of the reactions given by equations (2) and (3), respectively.

Intrinsic reaction rate equations for the Fischer-Tropsch reaction based on the Langmuir-Hinshelwood-Hougen-Watson (LHHW) and Eley-Rideal (ER) adsorption theories have been developed and used for cobalt- and iron-based catalysts.[2,36,37,38,39,40,41,42,43] The main mechanisms for FT reactions over iron catalysts are the carbide, enolic, and direct insertion theories.[2,38,42]

Table 5 shows a list of ER and LHHW type FT rate expressions that have been proposed for the iron-based FT synthesis.[36,37,38,39,40,41] Model FT1 is the simple and first order reaction in hydrogen. It has been reported that Equation FT1 is suitable at low CO conversions. Equations FT2, FT3, FT4 and FT 8 are based on Eley-Rideal model with their characteristic of first order denominators. Equation FT2 is a general kinetic model, which considers inhibition by both water and $CO_2$ with full coverage of catalytic site with CO, $H_2O$ and $CO_2$. Equation FT3 is consistent with the carbide theory in which CO dissociates on the surface. Adsorbed carbon reacts with hydrogen in the rate-determining step. In case of Model FT3, hydrogen is incorporated into the inhibition term which implies that the reaction order of hydrogen becomes larger than one, eventually approaching a value of two, as the syngas conversion increases. FT4 only accounts for the $CO_2$ inhabitation. Equations FT5, FT6 and FT7 are based on the LHHW adsorption model with second order inhibition terms. For these models, the effect of vacant sites is also taken into account.

Several mechanisms for the water-gas-shift reaction using single water-gas-shift catalysts and in the presence of FT reactions are proposed in the literature.[2] The two most common mechanisms are formate and direct oxidation mechanisms.[40] In the case of the formate mechanism, the formate species can be formed by the reaction between a carbon monoxide in the gas phase or in the adsorbed state with a hydroxy species or water. Water can provide the hydroxyl intermediate. Finally, the formate intermediate is reduced to adsorbed or gaseous carbon dioxide.

In the case of the direct oxidation mechanism, adsorbed or gas-phase CO is oxidized to $CO_2$. The oxygen intermediate can be formed from the dissociation of water or CO. A list of rate expressions for water-gas-shift reaction is given in Table 5.

It has been reported that for the WGS reaction, a first order rate in CO (Equation WGS1) is satisfactory. The major drawback of Equation WGS1 is the fact that it does not account for the reversibility of the WGS reaction.[36] This means that it is only applicable when the reaction is far from equilibrium. Equations WGS2-WGS7 are based on LHHW adsorption model accounting for the reversibility of WGS reactions. These rate expressions can be used for catalysts with low WGS activity, where water concentrations are high, as well as for catalysts with high shift activity showing inhibition by $CO_2$. For the water-gas-shift reaction, a general form of reaction rate was also proposed as follows $$r_{FT} = \frac{k_W \cdot (P_{CO} \cdot P_{H2O} - P_{CO2} \cdot P_{H2}/K_{we})}{P_{CO} + cP_{H2O} + dP_{CO2}} \quad (6)$$

wherein $K_{we}$ is the equilibrium constant and a known function of temperature as follows[36]:

$$K_{we} = \exp(4578/T - 4.33) \quad (7)$$

Materials and Methods

The reactor model was solved using ode23s Matlab function. A multiple nonlinear regression (Gauss-Newton) method (Optimization Toolbox: lsqnonlin Matlab function) was applied to obtain the values of unknown parameters (k) for the reaction rate equations. Using this nonlinear least squares regression procedure, the difference between calculated molar flow rate of all reactants and products (CO, $H_2$, $CO_2$, $H_2O$ and $C_nH_m$) with experimental flow rates in the exit of reactor were minimized. Confidence limits on the estimated model parameters were calculated at 95%. The unknown parameter estimates were constrained to be greater than or equal to zero in all cases. As a measure of the quality of the kinetic predictions of rate equations, the relative variances of the kinetic models were calculated as follows $$S_{rel} = \left( \sum_{i=1}^{N} \left( \frac{F_i^{exp} - F_i^{calc}}{F_i^{exp}} \right)^2 \cdot \frac{1}{N-M} \right)^{\frac{1}{2}} \times 100 \quad (8)$$

wherein $F^{exp}$ and $F^{calc}$ are the experimental and calculated values for molar flow rates at the exit of the reactor, N is the number of experimental data points and M is the number of unknown parameters.

The rate measurements were conducted using the 0.5Cu-1K-0.5Mo-30Fe/CNT catalyst in a fixed-bed reactor. The experimental data were obtained by varying temperature (255, 275 and 285° C.), total pressure (1-6 MPa), GHSV (3.6-21.6 Sl/g-cat/h) and CO:$H_2$ molar ratio (1, 1.5 and 2). Experimental results at different operating conditions consisting of carbon monoxide conversions and the carbon dioxide concentration in the product stream are given in Table 6. These data were used for the regression analysis.

In order to determine the most suitable reaction expression and mechanism, combinations of the Fischer-Tropsch and water-gas-shift reaction rates given in Table 5 were sequentially evaluated. This included 56 trials of different combinations of eight FT rate and seven WGS rate expressions. For each combination, the $S_{rel}$ corresponding to molar flow rates of reactants and products were calculated. A selected combination of FT and WGS models and corresponding $S_{rel}$ are given in Table 7. As can be seen in this table, the lowest $S_{rel}$ and the best data fit belong to the FT7 and W7 combination. FT7 is derived from the combined enol/carbide mechanism in which the rate-determining step is the dual site surface reaction between adsorbed formyl and dissociated $H_2$. FT7 was reported to be the best expression by Yates and Satterfield in a slurry reactor.[44] The results of the nonlinear regression and reaction rate constants for Equations FT7 are given in Table 8.

According to the data in Table 7, Equation W7 explains the experimental data with the least $S_{rel}$ among the other rate expression given in this study. For W7, the terms in the denominator account for the effects of vacant sites, site occupation by adsorbed molecular water, and site occupation by hydroxyl groups, respectively. Since there is no CO term in the denominator, it can be concluded that the effect of adsorption of CO over the active catalytic site for water-gas-shift reaction is not significant.

In order to evaluate $CO_2$ and $H_2O$ inhabitation over iron catalysts supported on CNTs, the reaction rate constants for FT2 and W3 were calculated by the non-linear regression method. These rate expressions account for $CO_2$ adsorption on catalytic sites for FT and WGS reactions. As can be seen in Table 8, the coefficients for $CO_2$ at the denominator are zero, thus for FT and WGS reaction rates, the $CO_2$ inhabitation can be neglected. In addition, comparing the results of the relative variances for FT7 and FT5 reactions shows that the water effect on the FT reaction should be included (in the denominator) in the reaction models.

Using first order models (FT1 and W1) for FT and WGS reactions with Arrhenius-type equations, activation energies were evaluated over a range of temperatures (250-285° C.). The activation energy obtained of 78.6 kJ/mol for the Fischer-Tropsch reaction is close to but lower than values reported by other researchers.[36]

In order to compare the activity of the 0.5Cu-1K-0.5Mo-30Fe/CNT catalyst with precipitated and commercial catalysts, a first order kinetic equation form (in hydrogen) was used. Using first order kinetics, any inhibition effects are lumped into the first order rate constant. These inhibition effects will be reflected both in the numerical values of the rate constant and their corresponding activation energies. The results of comparison of performance of our catalyst with a precipitated catalyst and a commercial catalyst (Ruhrchemie) are given in Table 9. Based on the apparent rate constants (catalyst weight base), the activity of the iron catalyst supported on MWCNTs is higher than that of the precipitated and commercial catalysts at the same temperature.[36] It should be noted that iron loadings on the precipitated and commercial catalysts were 100 wt % and 74 wt %, respectively, while the iron loading on the MWCNT-supported catalyst is 30 wt %. Considering the iron loadings, the apparent rate constant for the 0.5Cu-1K-0.5Mo-30Fe/CNT catalyst is about 4.5 times higher than the commercial catalyst under the same operating conditions.

While the present application has been described with reference to what are presently considered to be the preferred examples, it is to be understood that the application is not limited to the disclosed examples. To the contrary, the application is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE APPLICATION

[1] M. E. Dry, Fischer-Tropsch reactions and the environment, Applied Catalysis A: General, 189 (1999) 185-190.

[2] G. P. van der Laan, A. A. C. M. Beenackers, Selectivity of the Fischer-Tropsch Synthesis: A Literature Review, Catalysis Reviews, 41 (1999) 255-318.

[3] M. J. A. Tijmensen, A. P. C. Faaij, C. N. Hamelinck, M. R. M van Hardeveld, Exploration of the possibilities for production of Fischer Tropsch liquids and power via biomass gasification, Biomass and Bioenergy, 23 (2002) 129-152.

[4]C. H. Bartholomew, Recent technological developments in Fischer-Tropsch catalysis, Catalysis Letter, 7 (1990) 303-316.

[5]R. J. O'Brien, L. Xu, R. L. Spicer, S. Bao, D. R. Milburn, B. H. Davis, Activity and selectivity of precipitated iron Fischer-Tropsch catalysts, Catalysis Today, 36 (1997) 325-334.

[6]Y. Yang, H. Xiang, Y. Xu, L. Bai, Y. Li, Effect of potassium promoter on precipitated iron-manganese catalyst for Fischer-Tropsch synthesis, Applied Catalysis A: General, 266 (2004) 181-194.

[7]J. Zhang, J. Chen, J. Ren, Y. Li, Y. Sun, Support effect of $Co/Al_2O_3$ catalysts for Fischer-Tropsch synthesis, Fuel, 82 (2003) 581-586.

[8]D. B. Bukur, X. Lang, D. Mukesh, W. H. Zimmerman, M. P. Rosynek, and C. Li, Binder/support effects on the activity and selectivity of iron catalysts in the Fischer-Tropsch synthesis, Industrial Engineering Chemistry Research, 29 (1990) 1588-1599.

[9]S. Qin, C. Zhang, J. Xu, B. Wu, H. Xiang, Y. Li, Mo and Cu modified $FeK/SiO_2$ catalysts for Fischer-Tropsch synthesis, Chinese Journal of Catalysis, 31 (2010) 1132-1138.

[10]G. L. Bezemer, P. B. Radstakea, U. Falke, H. Oosterbeek, H. P. C. E. Kuipers, A. J. van Dillen, K. P. de Jong, J. Catal. 237 (2006) 152-161.

[11]G. L. Bezemer, P. B. Radstake, V. Koot, A. J. van Dillen, J. W. Geus, K. P. de Jong, J. Catal. 237 (2006) 291-302.

[12]G. L. Bezemer, J. H. Bitter, H. P. C. E. Kuipers, H. Oosterbeek, J. E. Holewijn, X. Xu, F. Kapteijn, A. J. van Dillen, and K. P. de Jong, J. Am. Chem. Soc. 128 (2006) 3956.

[13]Z. Yu, Ø. Borg, D. Chen, B. C. Enger, V. Frøseth, E. Rytter, H. Wigum, and A. Holmen, Catal. Lett. 109 (2006) 43-47.

[14]A. Tavasolia, K. Sadagiania, F. Khorasheb, A. A. Seifkordib, A. A. Rohani, A. Nakhaeipoura, Fuel Proc. Tech. (2007). doi:10.1016/j.fuproc.2007.09.008

[15]A. Tavasoli, A. M. Rashidi, K. Sadaghiani Zadeh, A. Karimi, A. Kodadadi, Y. A. Mortazavi, (2005) European Patent No. EP 1,782,885.

[16]A. Tavasoli, K. Sadaghiani, A. Nakhaeipour, M. Ghalbi Ahangari, Iranian. J. Chem. & Chem. Eng. 26 (2007) 1-9.

[17]W. Ma, E. L. Kugler, J. Wright, and D. B. Dadyburjor, Mo—Fe Catalysts Supported on Activated Carbon for Synthesis of Liquid Fuels by the Fischer-Tropsch Process: Effect of Mo Addition on Reducibility, Activity, and Hydrocarbon Selectivity, Energy Fuels 20 (2006) 2299-2307.

[18]L. Guczi, G. Stefler, O. Geszti, Zs. Koppány, Z. Kónya, É. Molnár, M. Urbánc, I. Kiricsi, J. Catal. 244 (2006) 24-32.

[19]M. C. Bahome, L. L. Jewell, K. Padayachy, D. Hildebrandt, D. Glasser, A. K. Datye, N. J. Coville, Fe—Ru small particle bimetallic catalysts supported on carbon nanotubes for use in Fischer-Tropsch synthesis, Applied Catalysis A: General, 328 (2007) 243-251.

[20]E. van Steen, F. F. Prinsloo, Catal. Tod. 71 (2002) 327-334.

[21]M. C. Bahome, L. L. Jewell, D. Hildebrandt, D. Glasser, N. J. Colville, Fischer-Tropsch synthesis over iron catalysts supported on carbon nanotubes, Applied Catalysis A: General, 287 (2005) 60-67.

[22]H. J. Jung, P. L. Walker Jr., M. A. Vannice, J. Catal. 75 (1982) 416-422.

[23]A. A. Chen, M. A. Vannice, and J. Phillips, J. of Phy. Chem., 91 (1987) 6257-6269.

[24]P. Serp, M. Corrias, P. Kalck, Appl. Catal. A: Gen. 253 (2003) 337-358.

[25]H. J. Jung, P. L. Walker Jr., M. A. Vannice, J. Catal. 75 (1982) 416-422.

[26]A. A. Chen, M. A. Vannice, and J. Phillips, J. of Phy. Chem., 91 (1987) 6257-6269.

[27]W. P. Ma, E. L. Kugler, D. B. Dadyburjor, Stud. Surf. Sci. Catal., 163 (2007) 125-140.

[28]W. Ma, E. L. Kugler, D. B. Dadybujor, Effect of properties of various activated-carbon supports and supported Fe—Mo—Cu—K catalysts on metal precursor distribution, metal reduction, and Fischer-Tropsch synthesis, Energy Fuels, 24 (2010) 4099-4110.

[29]W. Ma, E. L. Kugler, J. Wright, D. B. Dadyburjor, Development of molybdenum-promoted catalysts supported on activated carbon for diesel fuel synthesis, Final Technical Report for DOE Contract No. De-FC26-02NT41594, Prepared by the Consortium for Fossil Fuel Science, submitted Apr. 10, 2006.

[30]A. Tavasoli, M. Trépanier, R. M. Malek Abbaslou, A. K. Dalai, N. Abatzoglou, Fischer-Tropsch synthesis on mono- and bimetallic Co and Fe catalysts supported on carbon nanotubes, Fuel Processing Technology, 90 (2009) 1486-1494.

[31]R. M. Malek Abbaslou, A. Tavasoli, A. K. Dalai, Effect of pre-treatment on physico-chemical properties and stability of carbon nanotubes supported iron Fischer-Tropsch catalysts, Applied Catalysis A: General, 355 (2009) 33-41.

[32]R. M. Malek Abbaslou, A. Tavassoli., J. Soltan, A. K. Dalai, Iron catalysts supported on carbon nanotubes for Fischer-Tropsch synthesis: Effect of catalytic site position, Applied Catalysis A: General 367 (2009) 47-52.

[33]R. M. Malek Abbaslou, J. Soltan, A. K. Dalai, Effects of nanotubes pore size on the catalytic performances of iron catalysts supported on carbon nanotubes for Fischer-Tropsch synthesis, Applied Catalysis A: General 379 (2010) 129-134.

[34]N. Lohitharn, J. G. Goodwin Jr., E. Lotero, Fe-based Fischer-Tropsch synthesis catalysts containing carbide-forming transition metal promoters, Journal of Catalysis, 255 (2008) 104-113.

[36]H. S. Fogler, Elements of chemical reaction engineering, second edition, Prentice Hall PTR, (1992).

[36]W. H. Zimmerman, D. B. Bukur, Binder/support effects on the activity and selectivity of iron catalysts in the Fischer-Tropsch synthesis Canadian Journal of Chemical Engineering, 68 (1990) 194-199.

[37]M. J. Keyser, R. C. Everson, and R. L. Espinoza, Fischer-Tropsch Kinetic Studies with Cobalt-Manganese Oxide Catalysts, Industrial Engineering Chemistry Research, 39 (2000) 48-54.

[38]G. A. Huff, Jr., and C. N. Satterfield, Kinetic design considerations in the Fischer-Tropsch synthesis on a reduced fused-magnetite catalyst, Ind. Eng. Chem. Process Des. Dev. 23 (1984) 696-706.

[39]F. G. Botes, Water-gas-shift kinetics in the iron-based low-temperature Fischer-Tropsch synthesis, Applied Catalysis A: General, 328 (2007) 237-242.

[49]G. P. van der Laan, A. A. C. M. Beenackers, Intrinsic kinetics of the gas-solid Fischer-Tropsch and water gas shift reactions over a precipitated iron catalyst, Applied Catalysis A: General, 193 (2000) 39-53.

[41]F. G Botes, B. B. Breman, Development and Testing of a New Macro Kinetic Expression for the Iron-Based Low-Temperature Fischer-Tropsch Reaction, Industrial Engineering Chemistry Research, 45 (2006) 7415-7426.

[42] B. H. Davis, Fischer-Tropsch Synthesis: Reaction mechanisms for iron catalysts Catalysis Today, 141 (2009) 25-33.

[43] B. Sarup, B. W. Wojciechowski, Studies of the Fischer-Tropsch Synthesis on a Cobalt Catalyst: Mechanistic Formulation of the Kinetics Selectivity for Higher Hydrocarbon, Canadian Journal of Chemical Engineering, 67 (1989) 620-627.

[44] I. C. Yates, C. N. Satterfield, Intrinsic kinetics of the Fischer-Tropsch synthesis on a cobalt catalyst, Energy Fuels. 5 (1991) 168.

[45] P. N. Dyer, A. F. Nordquist, R. Pierantozzi (1986) U.S. Pat. No. 4,652,587.

TABLE 1

| Catalyst Name | BET Surface Area ($m^2/g$) | Total Pore Volume (ml/g) | Particle Size (nm)-XRD | Particle Size (nm)-TEM |
|---|---|---|---|---|
| CNT-support | 220 | 0.58 | — | — |
| 0.5Mo—30Fe/CNT | 140 | 0.42 | 15 ± 2 | 8-17 |
| 1K—0.5Mo—30Fe/CNT | 141 | 0.39 | 14 ± 1 | 6-15 |
| 2K—0.5Mo—30Fe/CNT | 142 | 0.38 | 13 ± 2 | 6-15 |
| 0.5Cu—1K—0.5Mo—30Fe/CNT | 139 | 0.42 | 12 ± 1 | 7-16 |
| 1Cu—1K—0.5Mo—30Fe/CNT | 136 | 0.40 | 12 ± 1 | 7-17 |

TABLE 2

| Catalyst Name | Peak A (°C.) | Peak B (°C.) | Extent of Reduction % (from 25 to 800° C.) | Extent of Reduction % (from 25 to 400° C. for 5 hr) |
|---|---|---|---|---|
| 0.5Mo—30Fe/CNT | 421 | 650 | 66 | 50 |
| 1K—0.5Mo—30Fe/CNT | 419 | 655 | 72 | 57 |
| 2K—0.5Mo—30Fe/CNT | 418 | 652 | 70 | 51 |
| 0.5Cu—1K—0.5Mo—30Fe/CNT | 341 | 643 | 80 | 70 |
| 1Cu—1K—0.5Mo—30Fe/CNT | 304 | 642 | 84 | 73 |

TABLE 3

| Activity and Product selectivity | 0.5Mo—30Fe/CNT | 1K—0.5MO—30Fe/CNT | 2K—0.5Mo—30Fe/CNT | 0.5Cu—1K—0.5Mo—30Fe/CNT | 1Cu—1K—0.5Mo—30Fe/CNT |
|---|---|---|---|---|---|
| CO % | 44 | 77 | 54 | 84 | 70 |
| $CH_4$ | 16 | 5 | 3 | 4 | 6 |
| $C_2$-$C_4$ | 31 | 19 | 15 | 18 | 22 |
| $C_5$-$C_{11}$ | 45 | 47 | 36 | 45 | 47 |
| $C_{12+}$ | 8 | 29 | 46 | 33 | 25 |
| $CO_2$ (C %) | 38 | 42 | 44 | 41 | 43 |
| α | 0.70 | 0.80 | 0.86 | 0.82 | 0.79 |

TABLE 4

| Ref | Support | T (°C.) | P (MPa) | $H_2$/CO | GHSV SI/g/h ($h^{-1}$) | Activity mg HC/g-Fe/h | % CO mol % | $CH_4$ | $C_5$+ | $CO_2$ | O/P |
|---|---|---|---|---|---|---|---|---|---|---|---|
| [a] | CNT | 250 | 2.04 | 1 | 3.6 (2600) | 0.8 | 42 | 3 | 82 | 38 | 4 |
| [a] | CNT | 285 | 2.72 | 1 | 10.8 (7800) | 5.6 | 95 | 6 | 76 | 44 | 3.6 |
| [a] | CNT | 270 | 2.24 | 2 | 5.4 (3900) | 2 | 94 | 11 | 61 | 34 | 2.1 |
| [17] | AC | 320 | 2.04 | 0.9 | 3 | 3.1 | 84 | 15 | 39.4 | 46 | 2.2 |
| [21] | CNT | 275 | 0.79 | 2 | (2120) | — | 80 | 14.6 | 43 | — | 0.11 |
| [19] | CNT | 275 | 0.79 | 2 | (2142) | — | 60 | 19.3 | 38.3 | — | 0.33 |
| [45] | Zr—Ti | 270 | 2.04 | 1 | (1000)* | 0.97* | 18.4 | 15.7 | 49.8 | — | — |
| [5] | Si | 230 | 1.36 | 0.6 | 3.1* | 0.22* | 35 | 3.8 | 81 | 42 | 2.8 |
| [8] | $SiO_2$ | 250 | 1.5 | 1 | 2* | — | 78 | 7.3 | 65.7 | 43.1 | 2.66 |

[a]: 0.5% Cu-1% K-0.5% Mo-30% Fe/CNT from the present report
[17]: 0.8% Cu-0.9% K-6% Mo-15.7% Fe
[21]: 12.1% Fe
[19]: 0.25% Ru-0.2% K-0.6% Cu-10% Fe
[45]: 14.7% Fe
[5]: 2.7% Cu-3.3% K-92% Fe
[8]: 4.3% Cu-3.6% K-85% Fe
*Numbers are calculated (for easier comparison) based on the data provided in the corresponding report.

TABLE 5

| FT Model Number | FT Model | WGS Model Number | WGS Model |
|---|---|---|---|
| FT1 | $r_{FT} = k_1 \cdot P_{H2}$ | W1 | $r_{WGS} = k_W \cdot P_{CO}$ |
| FT2 | $r_{FT} = \dfrac{k_{FT} \cdot P_{CO} \cdot P_{H2}}{P_{CO} + a \cdot P_{CO2} + b \cdot P_{H2O}}$ | W2 | $r_{WGS} = k_W (P_{CO} \cdot P_{H2O} - P_{CO2} \cdot P_{H2}/K_w)$ |

TABLE 5-continued

| FT Model Number | FT Model | WGS Model Number | WGS Model |
|---|---|---|---|
| FT3 | $r_{FT} = \dfrac{k_{FT}.P_{CO}.P_{H2}^2}{P_{CO}.P_{H2} + a.P_{H2O}}$ | W3 | $r_{WGS} = \dfrac{k_W(P_{CO}.P_{H2O} - P_{CO2}.P_{H2}/K_w)}{P_{CO} + c.P_{H2O} + d.P_{CO2}}$ |
| FT4 | $r_{FT} = \dfrac{k_{FT}.P_{CO}.P_{H2}}{P_{CO} + a.P_{CO2}}$ | W4 | $r_{WGS} = \dfrac{k_W(P_{CO}.P_{H2O} - P_{CO2}.P_{H2}/K_w)}{(P_{CO} + c.P_{H2O})^2}$ |
| FT5 | $r_{FT} = \dfrac{k_{FT}.P_{CO}.P_{H2}}{(1 + b.P_{CO})^2}$ | W5 | $r_{WGS} = \dfrac{k_W(P_{CO}.P_{H2O} - P_{CO2}.P_{H2}/K_w)}{P_{H2}.P_{CO} + c.P_{H2O}}$ |
| FT6 | $r_{FT} = \dfrac{k_{FT}.P_{CO}.P_{H2}^{0.5}}{(1 + a.P_{H2O} + a.P_{CO})^2}$ | W6 | $r_{WGS} = \dfrac{k_W(P_{CO}.P_{H2O} - P_{CO2}.P_{H2}^{0.5}/K_w)}{(1 + c.P_{H2O}/P_{H2}^{0.5})^2}$ |
| FT7 | $r_{FT} = \dfrac{k_{FT}.P_{CO}.P_{H2}}{(1 + a.P_{H2O} + b.P_{CO})^2}$ | W7 | $r_{WGS} = \dfrac{k_W(P_{CO}.P_{H2O} - P_{CO2}.P_{H2}/K_w)}{(1 + c.P_{H2O}/P_{H2}^{0.5} + d.P_{H2O})^2}$ |
| FT8 | $r_{FT} = \dfrac{k_{FT}.P_{CO}.P_{H2}}{(1 + a.P_{H2O} + b.P_{CO})}$ | | |

TABLE 6

| GHSV Sl/g-cat/h | T (°C.) | P (MPa) | $H_2$/CO | % CO Conversion | $CO_2$ |
|---|---|---|---|---|---|
| 14.4 | 275 | 1.02 | 2 | 49 | 40 |
| 10.8 | 275 | 2.04 | 1 | 74 | 42 |
| 7.2 | 275 | 1.02 | 1 | 68 | 44 |
| 7.2 | 275 | 2.04 | 1 | 86 | 42 |
| 12.0 | 275 | 3.40 | 1 | 81 | 42 |
| 10.8 | 275 | 2.04 | 2 | 83 | 35 |
| 12.0 | 255 | 3.40 | 1 | 36 | 39 |
| 21.6 | 285 | 2.72 | 1 | 60 | 42 |
| 7.2 | 275 | 1.02 | 2 | 71 | 39 |
| 5.4 | 275 | 2.04 | 1 | 85 | 43 |
| 3.6 | 275 | 1.02 | 1 | 84 | 44 |
| 3.6 | 275 | 2.04 | 1 | 97 | 43 |
| 14.4 | 275 | 1.02 | 1.5 | 43 | 40 |
| 10.8 | 275 | 2.04 | 1.5 | 81 | 37 |

TABLE 7

| FT model | WGS model | $S_{rel}$ molar flow rates |
|---|---|---|
| FT1 | W2 | 44.1 |
| FT2 | W3 | 19.8 |
| FT2 | W7 | 14.2 |
| FT3 | W5 | 19.1 |
| FT4 | W5 | 31.8 |
| FT5 | W7 | 30.5 |
| FT6 | W6 | 18.3 |
| FT7 | W6 | 16.0 |
| FT7 | W7 | 6.5 |
| FT8 | W6 | 17.1 |
| FT8 | W7 | 11.3 |

TABLE 8

| FT model | WGS model | $k_{FT}$ mol/g-cat · h · MPa | a | b | $k_{WGS}$ mol/g-cat · h · MPa | c | d |
|---|---|---|---|---|---|---|---|
| FT7 | W7 | 0.603 | 7.439 | 0.01 | 26.334 | 22.110 | 11.627 |
| FT2 | W3 | 0.111 | 2.850 | 0 | 3.621 | 17.337 | 0 |

TABLE 9

| FT model | | $k_{FT}$ | 100 Fe/0.3 Cu/O•2 K[36] | Commercial Catalyst (Ruhrchemie)[36] | 0.5Cu—1K—0.5Mo—30Fe/CNT [this report] |
|---|---|---|---|---|---|
| $r_{FT} = k_{FT} \cdot P_{H2}$ | mol/g-cat · h · MPa (catalyst base) | | 0.065 | 0.040 | 0.074 |
| | mol/g-Fe · h · MPa (iron base) | | 0.066 | 0.054 | 0.245 |

The invention claimed is:

1. A catalyst for use in the Fischer-Tropsch (FT) reaction comprising the formula (I):

    (I)

wherein
Cu is present in an amount of about 0.1 wt % to about 0.75 wt %;
K is present in an amount of about 0.1 wt % to about 1.5 wt %;
Mo is present in an amount of about 0.1 wt % to about 3 wt %; and
Fe is present in an amount of about 10 wt % to about 40 wt %; and
the remainder consisting essentially of a catalyst support, wherein the catalyst support is multi-walled carbon nanotubes (MWCNTs) having a surface area of at least about 220 m$^2$/g; and
the Cu, K, Mo and Fe are deposited on the support by impregnation using an incipient wetness impregnation method wherein the order of deposition is (1) Fe and Cu, (2) K, and (3) Mo, with a drying step in between each deposition, and at least about 80% of the iron particles are located inside the carbon nanotubes
wherein the catalyst provides an activity of about 2.0 to about 5.6 mg hydrocarbons (HC/gFe/h, a CO conversion of greater than about 94% and a $C_5$+ selectivity in the range of about 61 to about 76% in a Fischer-Tropsch reaction performed at a temperature in the range of about 270-285° C., a pressure in the range of about 2.2 to about 2.7 MPa, a $H_2$/CO ratio of about 1 to about 2 and a gas hourly space velocity (GHSV) of about 3900 to about 7800 h$^{-1}$.

2. The catalyst of claim 1, wherein
Cu is present in an amount of about 0.5 wt %;
K is present in an amount of about 1 wt %;
Mo is present in an amount of about 0.5 wt %; and
Fe is present in an amount of about 30 wt %.

3. The catalyst of claim 1, wherein the MWCNTs are treated with acid prior to impregnation.

4. The catalyst of claim 3, wherein the acid is nitric acid.

5. The catalyst of claim 1, wherein
the precursor compound for Fe is iron (III) nitrate nonahydrate;
the precursor compound for K is potassium nitrate;
the precursor compound for Mo is ammonium heptamolybdate tetrahydrate; and
the precursor compound for Cu is copper (II) nitrate trihydrate.

6. The catalyst of claim 2, wherein the catalyst has a surface area of about 136 m$^2$/g to about 140 m$^2$/g.

7. The catalyst of claim 2, wherein the catalyst has particle sizes ranging from about 7 nm to about 17 nm.

8. A process for performing the Fischer-Tropsch reaction comprising reacting a synthesis gas with a catalyst to convert the synthesis gas to Fischer-Tropsch products, wherein the catalyst comprises the formula (I):

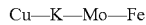    (I)

wherein:
Cu is present in an amount of about 0.1 wt % to about 0.75 wt %;
K is present in an amount of about 0.1 wt % to about 1.5 wt %;
Mo is present in an amount of about 0.1 wt % to about 3 wt %; and
Fe is present in an amount of about 10 wt % to about 40 wt %; and
the remainder consisting essentially of a catalyst support, wherein the catalyst support is multi-walled carbon nanotubes (MWCNTs) having a surface area of at least about 220 m$^2$/g; and
the Cu, K, Mo and Fe are deposited on the support by impregnation using an incipient wetness impregnation method wherein the order of deposition is (1) Fe and Cu, (2) K, and (3) Mo, with a drying step in between each deposition, and at least about 80% of the iron particles are located inside the carbon nanotubes
wherein the catalyst provides an activity of about 2.0 to about 5.6 mg hydrocarbons (HC/gFe/h, a CO conversion of greater than about 94% and a $C_5$+ selectivity in the range of about 61 to about 76% in a Fischer-Tropsch reaction performed at a temperature in the range of about 270-285° C., a pressure in the range of about 2.2 to about 2.7 MPa, a $H_2$/CO ratio of about 1 to about 2 and a gas hourly space velocity (GHSV) of about 3900 to about 7800 h$^{-1}$.

9. The process of claim 8, wherein the temperature is about 270° C., the pressure is about 2 M Pa, and the GHSV is about 3900 h$^{-1}$.

10. The process of claim 9, wherein the molar ratio of $H_2$:CO is about 1:1.

11. A process for producing high molecular weight hydrocarbons from synthesis gas, the process comprising reacting the synthesis gas with a catalyst to form high molecular weight hydrocarbons, wherein the catalyst comprises the formula (I):

    (I)

wherein:
Cu is present in an amount of about 0.1 wt % to about 0.75 wt %;
K is present in an amount of about 0.1 wt % to about 1.5 wt %;
Mo is present in an amount of about 0.1 wt % to about 3 wt %; and
Fe is present in an amount of about 10 wt % to about 40 wt %; and
the remainder consisting essentially of a catalyst support, wherein the catalyst support is multi-walled carbon nanotubes (MWCNTs) having a surface area of at least about 220 m$^2$/g; and
the Cu, K, Mo and Fe are deposited on the support by impregnation using an incipient wetness impregnation method wherein the order of deposition is (1) Fe and Cu, (2) K, and (3) Mo, with a drying step in between each deposition, and at least about 80% of the iron particles are located inside the carbon nanotubes
wherein the catalyst provides an activity of about 2.0 to about 5.6 mg hydrocarbons (HC/gFe/h, a CO conversion of greater than about 94% and a $C_5$+ selectivity in the range of about 61 to about 76% in a Fischer-Tropsch reaction performed at a temperature in the range of about 270-285° C., a pressure in the range of about 2.2 to about 2.7 MPa, a $H_2$/CO ratio of about 1 to about 2 and a gas hourly space velocity (GHSV) of about 3900 to about 7800 h$^{-1}$.

12. The process of claim 11, wherein the temperature is about 270° C., the pressure is about 2 M Pa, and the GHSV is about 3900 h$^{-1}$.

13. The process of claim 12, wherein the molar ratio of $H_2$:CO is about 1:1.

* * * * *